US008468336B2

(12) United States Patent
Finlay

(10) Patent No.: US 8,468,336 B2
(45) Date of Patent: Jun. 18, 2013

(54) SYSTEM AND METHOD FOR PROVIDING SECURITY VIA A TOP LEVEL DOMAIN

(75) Inventor: Scott Andrew Finlay, Bridgewater, NJ (US)

(73) Assignee: Park Avenue Capital LLC, Jersey City, NJ (US)

( * ) Notice: Subject to any disclaimer, the term of this patent is extended or adjusted under 35 U.S.C. 154(b) by 0 days.

(21) Appl. No.: 13/237,334

(22) Filed: Sep. 20, 2011

(65) Prior Publication Data

US 2012/0011357 A1 Jan. 12, 2012

Related U.S. Application Data

(63) Continuation of application No. 12/012,128, filed on Jan. 31, 2008, now Pat. No. 8,037,298.

(51) Int. Cl.
*H04L 9/00* (2006.01)

(52) U.S. Cl.
USPC .............................. 713/152; 726/1; 380/277

(58) Field of Classification Search
USPC ........................................................ 713/152
See application file for complete search history.

(56) References Cited

U.S. PATENT DOCUMENTS

| | | | |
|---|---|---|---|
| 7,296,155 B1 | 11/2007 | Trostle et al. | |
| 7,539,291 B2 * | 5/2009 | D'Angelo et al. | 379/88.17 |
| 2002/0184390 A1 | 12/2002 | Alkhatib | |
| 2003/0118005 A1 * | 6/2003 | Ostberg et al. | 370/352 |
| 2004/0098485 A1 | 5/2004 | Larson et al. | 709/227 |
| 2004/0250119 A1 | 12/2004 | Shelest et al. | |
| 2005/0289085 A1 | 12/2005 | Hamber | |
| 2006/0195609 A1 | 8/2006 | Han | |
| 2006/0230461 A1 | 10/2006 | Hauser | 726/27 |
| 2007/0094273 A1 * | 4/2007 | Fritsch et al. | 707/10 |
| 2007/0239997 A1 | 10/2007 | Qu et al. | |
| 2008/0216168 A1 | 9/2008 | Larson et al. | 726/15 |
| 2008/0307513 A1 | 12/2008 | Chow et al. | 726/5 |

FOREIGN PATENT DOCUMENTS

| | | |
|---|---|---|
| EP | 1746789 | 1/2007 |
| GB | 2377143 | 12/2002 |

OTHER PUBLICATIONS

PCT International Search Report PCT/ISA/210, Jun. 7, 2009.
PCT Written Opinion of the International Searching Authority PCT/ISA/237, Jun. 7, 2009.

\* cited by examiner

*Primary Examiner* — Matthew Smithers
(74) *Attorney, Agent, or Firm* — Dilworth & Barrese, LLP.

(57) ABSTRACT

A system and method is disclosed for providing end-to-end security for communications between registered clients of a top level domain without the need for further encryption/decryption protocols than those provided by said at least one of said plurality of secure communication links and said at least one secure message server. Clients registered with the top level domain are assigned at least one email and IM account and to ensure message security, are required to communicate with other registered others strictly via the assigned email and IM accounts. In this manner, non-registered users are denied secure access to the top level domain. In one embodiment, registered clients of the top-level domain may communicate with non-registered users via a gateway server in a secure or non-secure manner, as is the option of the registered client (sender).

23 Claims, 17 Drawing Sheets

.mdEmail™

Welcome to Account Registration
This is the account registration process. It consists of three steps. You begin the process by entering the address you wish to register.

Step 1 - Enter Address
Please provide your email address to begin the registration process.
Email Address: robmstraughn@gmail.com

[NEXT] [CANCEL]

Copyright © 2006 MaxMD | Terms of Service | Privacy Policy | Support

.md Because medicine is your domain.

.mdEmail™

Step 1 (Completed)
Registered address: robmstraughn@gmail.com
Change Address

Step 2 - Enter a Password
Select the password for the account (robmstraughn@gmail.com).
Password must be at least 7 characters long. Password must be letters and numbers (no symbols). Password must be mixed case (a mix of UPPER and lower case letters).

Password: •••••••
Confirm Password: •••••••

[NEXT] [CANCEL]

Copyright © 2006 MaxMD | Terms of Service | Privacy Policy | Support

.md Because medicine is your domain.

.mdEmail™

Step 1 (Completed)
Registering address: robmstraughn@gmail.com
Change Address

Step 2 (Completed)
Password Selected
Change Password

Note: you can change this information if you need to

Step 3 (Completed)
Details Provided

Step 3 - Enter Account Details
Please complete your account data.

| Field | Value |
|---|---|
| First name: | Rob |
| Middle Initial: | M |
| Last name: | Straughn |
| Secret Question: | Favorite cookie |
| Secret Answer: | Fig newton |
| Country: | United States of America |

[SUBMIT] [CANCEL]

Copyright © 2006 MaxMD | Terms of Service | Privacy Policy | Support

.md Because medicine is your domain

FIGURE 14

.mdEmail™

Welcome to account registration.

Step 1    Step 2    Step 3    Step 4

The .mdEmail registration process is completed in four simple steps.
Please confirm the email address you with to register.

user@domain.md

Yes  Cancel

Copyright © 2006 MaxMD | Terms of Service | Privacy Policy | Support

.md Because medicine is your domain.                    Service provided by MaxMD

FIGURE 19

Welcome to account registration.

Step 1    Step 2    Step 3    Step 4

| Select the password for the account |
| user@domain.md  (Change Address) |

Your password must be:

* At least 7 characters long
* Include letters and numbers, no special characters
* Be mix of UPPER and lower case letters Password: 
Confirm Password:

Next  Cancel

FIGURE 20

.mdEmail™

Phase 1 Complete

Please wait for an email to user@domain.com with instructions explaining how to complete this process.

Copyright © 2006 MaxMD | Terms of Service | Privacy Policy | Support

.md Because medicine is your domain.    Service provided by MaxMD

FIGURE 21

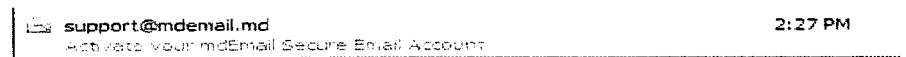

support@mdemail.md    2:27 PM
Activate your mdEmail Secure Email Account

FIGURE 22

.mdEmail™

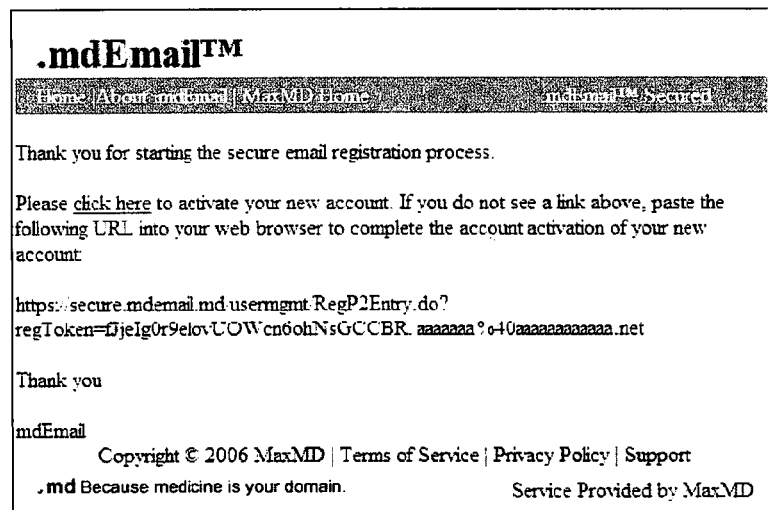

Thank you for starting the secure email registration process.

Please click here to activate your new account. If you do not see a link above, paste the following URL into your web browser to complete the account activation of your new account:

https://secure.mdemail.md/usermgmt/RegP2Entry.do?regToken=fJjeIg0r9elovUOWcn6ohNsGCCBR.aaaaaaa%o40aaaaaaaaaaaa.net Thank you mdEmail Copyright © 2006 MaxMD | Terms of Service | Privacy Policy | Support .md Because medicine is your domain.    Service Provided by MaxMD

SYSTEM AND METHOD FOR PROVIDING SECURITY VIA A TOP LEVEL DOMAIN

This application is a continuation of U.S. Pat. No. 8,037,298, issued Oct. 11, 2011, the contents of which is hereby incorporated by reference herein in its entirety.

BACKGROUND OF THE INVENTION

1. Field of the Invention

The present disclosure pertains generally to secure communications and more particularly to a system and a method for providing end-to-end security for communications over a communication network such as the Internet without the need for further encryption protocols by communicating within a top level domain.

2. Description of the Related Art

Typically, individuals and many small businesses use an Internet Service Provider (ISP) for email and Internet access. The ISP usually issues the domain name and assigns IP addresses. Rather than using an ISP, more and more businesses are desiring to have more choices and control over their domain names. Additionally, many businesses prefer to run their own messaging servers in order to have increased functionality and control. While exercising such control provides increased functionality and control, security remains an ongoing concern for individuals and businesses alike. This concern for security is particularly acute in the world of healthcare, comprised of an independent collection of organizationally independent constituents, such as: hospitals, healthcare enterprises; physicians (group or small practices) and clinics; patients and consumers; payors and government (Medicare, Medicaid, etc.); pharmacies and other suppliers; home health agencies; knowledge sources and educational institutions. These constituents work together in highly dynamic relationships. As such, these constituents must share highly confidential information to conduct complex processes (e.g. surgical procedures, radiology exams, lab tests, prescription fulfillment and others).

Current methods of providing safe communication over networks for data and telecommunication often involve PKI (Public Key Infrastructure) solutions for information encryption, signing or authentication wherein one secret code or a public key is used to firstly encrypt pieces of data and another private code or key is utilized to decode the encrypted data. Such solutions principally involve a CA (Certification Authority), i.e. a trusted certificate provider, who verifies the identity of the holder of the private key and issues a secret code or key directly to an authorized client, user, and providing a public code or key in a directory or the like for collection when required for ensuring an authority, for example when a client, user, attempts to access specific locations, services or applications on the network where an authorization check is performed for maintaining a preset level of security.

A problem with utilizing PKI through an integrated platform at the client location as commonly accomplished, originates in the inflexibility and vulnerability of the security system configuration as a whole, among other matters referring to the access site-dependency i.e. in the case where a request to enter a secure network location, application or service fulfills the requirements for access granting, the requisites for providing access are previously distributed and stored locally in a secure device e.g. on a smart card or equivalent token, or in a protected area e.g. on a computer hard disc, a local server or the like local storage media often in the form of digital signatures and cryptographic keys embedded in an electronic document, protocol or script file. Whenever the requisites are stored locally in a protected area, access to this specific location subsequently also may be granted from a variety of different locations and computers depending on different accessing locations of the same authorized client, the same amount of possible unauthorized entryways exist to that secure network domain since such accessing information always will be downloaded and stored on media relating to respective new entryway. It could hence possibly be quite easy for an unauthorized entity to utilize such downloaded and locally stored access information to entry locations in what is called "secure" domains or for creating false access credentials. When the requisites are stored in a secure device, the access point to that device often is non-secure, e.g. through connection with the computers operating system or non-secure device drivers, subsequently causing analogous non-security considerations as with storing requisites in local storage media. Moreover there is a possibility that such accessing information, after being issued to a client by a CA, either is monitored or in some other way directly or indirectly intercepted by an unwanted entity seeking to force entry and manipulate contents in a secure location on the network.

Other problems relating to PKI authentication can also involve having to provide electronic authentication hardware or the like to a client following an access request and registration to a secure domain environment, representing a timely, costly and inflexible means of ensuring an authority for both the access seeking client and the administrator of the secure domain.

The above mentioned shortcomings with PKI security solutions, as currently mostly utilized, also constitutes a problem in the electronic communication between different trusted parties, for example between banks, each requiring a certain degree of network domain security and where one or several of the banks are CA to their clients and possibly may not trust each others network security solutions nor be able to issue guarantees based on others CA-policies. The level of security for accessing the network in one of the banks may for example not reach a certain set security standard as claimed by another bank, maybe for marketing purposes, making such a claim more or less useless when, for example, electronic transactions between these two banks are to be executed or mainly when establishing a network connection between the banks altogether, through which an unauthorized entry then is more easily achievable via the lower level security system into the higher security level system.

Since most banks and other like corporations and public authorities, which utilize networks for data and telecommunications as a means for communicating information provision and financial transactions to attract and keep clients by means of presenting the most safe and secure network environment on the market for such activities, problems of mistrust and network security divergences in the association between companies are still to be solved.

There could also be compatibility problems between different potent network security solutions in companies wanting to cooperate with each other, wherein such problems would be difficult, costly and time-consuming to overcome with an overall maintained high level of security without making major changes to at least one of the companies network security structure.

There is hence a need for a network security solution, that maximizes security in a user transparent way.

SUMMARY OF THE INVENTION

Accordingly, the present invention has been made in light of the above problems occurring in the prior art. The present invention provides systems and methods for ensuring end-to-end security for communications (messaging) between registered users of a top level domain without the need for conventional encryption protocols, such as PKI.

According to one aspect of the invention, to ensure secure end-to-end messaging between registered users of a top level domain, the registered users are assigned one or more email and IM accounts associated with the top-level domain. Using these assigned email accounts, messaging is conducted exclusively over secure communication links via a secure server. The secure server being associated with the top level domain. In this manner, secure messaging is assured without the need for conventional encryption protocols, such as PKI. Exemplary secure communication links contemplated by the invention include IMP/SSL, POP/SSL or SMTP/SSL. Future envisioned secure links are also contemplated for use by the invention.

According to one aspect of the invention, in those cases where a registered user of the top-level domain desires to communicate with a non-registered user, the registered user may modify his or her email account to trigger an encryption module to encrypt the message intended for the non-registered user.

In one embodiment of the invention, the top-level domain is the ".md" domain, registered to the inventors.

BRIEF DESCRIPTION OF THE DRAWINGS

These and other objects, features and advantages of the invention will be apparent from a consideration of the following Detailed Description Of The Invention considered in conjunction with the drawing Figures, in which:

FIGS. 6-11 illustrate a process for configuring the .md email for Microsoft Outlook;

FIGS. 12-14 illustrate a sender provisioning process for sending secure Email Messages from registered clients to non-registered clients;

FIGS. 15-28 illustrate a process whereby a message recipient provisions himself via round-trip email.

DETAILED DESCRIPTION OF THE PREFERRED EMBODIMENTS

Figure 1:
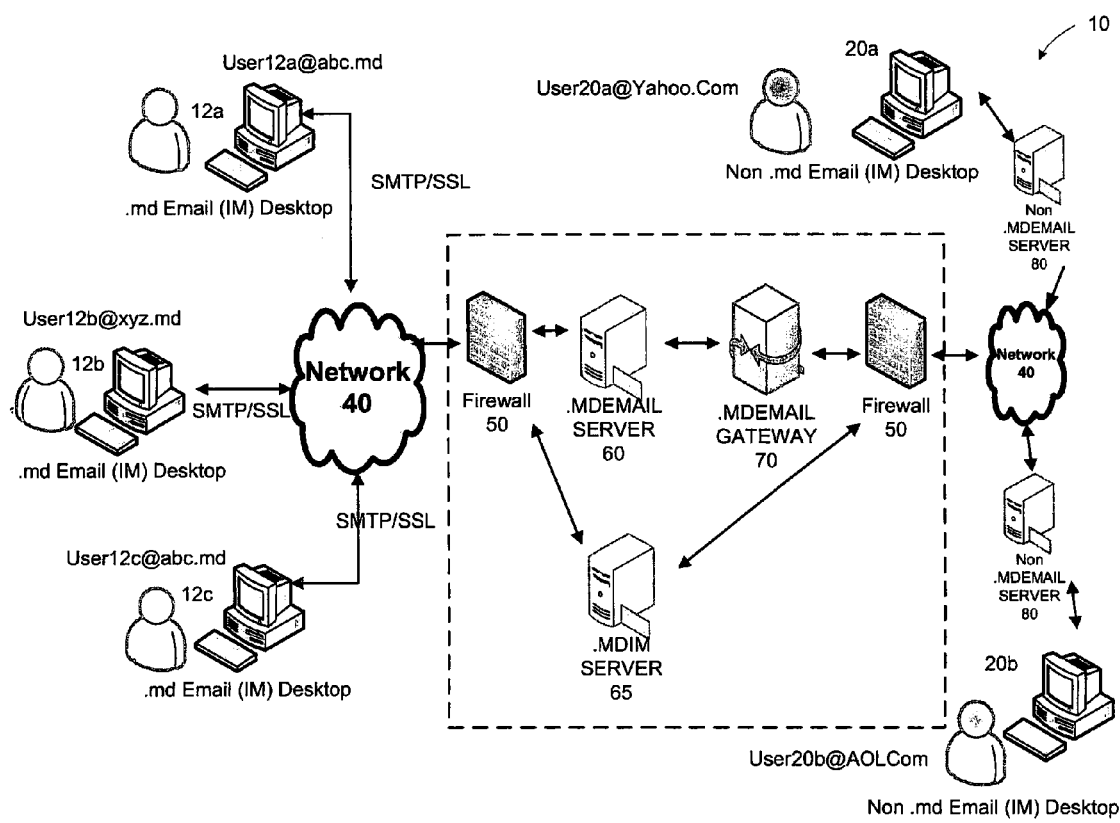
FIG. 1 is a block diagram that illustrates an overview of one embodiment of a system for providing end-to-end security for communications over a communication network using email and IM accounts associated with a top-level domain.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

The present disclosure is generally organized as follows.
General Overview
I. System Overview
II. Data Routing
III. Flowchart Illustrating Secure Email Messaging from a Registered User to other users, both registered and unregistered.
IV. Configuring .mdEmail to work with Microsoft Outlook
 1. Configuration Steps V. Sending Secure Email Messages from Registered Clients to Non-registered users
 1. Sender provisioning Process
 2. Recipient provisioning Process
VI. Flowchart illustrating sending secure IM Messages between two Registered Clients of a Top-level Domain.

General Overview

The present disclosure provides, in one aspect, end-to-end security between registered clients for communicating therebetween over a communication network such as the Internet via the use of email and IM accounts assigned by the top-level domain, without the need for encryption/decryption protocols and algorithms, as will be described further hereinafter referring to the related drawings.

I. System Overview

FIG. 1 is a block diagram of a system of the present invention, according to one embodiment, illustrating a relationship between system components for providing end-to-end secure messaging between registered message senders/receivers of the top level domain via pre-assigned email and IM accounts of the top-level domain.

In accordance with a key feature of the invention, messaging security between registered message senders and recipients of the top level domain is achieved without the need for further encryption/decryption protocols by requiring message senders/receivers to transmit/receive data messages from secure (email and IM) accounts provided by the top level domain. Messaging is conducted between sender/receiver exclusively via a secure server associated with the top level domain (e.g., .md message server 60). In other words, messages never touch a non-secure server while in transit from a message sender to a message receiver. In addition to the messages only residing at the secure server, messaging security is assured whereby the secure server is configured to only accept messages from message transmitters transmitted in accordance with a secure messaging protocol. This guarantees that the communication link connecting the secure server with the message senders/receivers is secure. Preferred secure messaging protocols contemplated by the invention include, by way of example and not limitation, the Internet Message Access Protocol (IMAP), the post office protocol (POP), and the Simple Mail Transport Protocol (SMTP), each of which is sent over SSL. It is further contemplated that other secure protocols may be used, not explicitly recited herein, which are well known in the art. In addition, future envisioned secure protocols are also contemplated for use by the invention. Further, any combination of secure protocols, known and envisioned are also contemplated for use by the invention.

In addition to facilitating secure messaging between registered users of the top-level domain, the present invention provides further capabilities to allow registered clients of the top-level domain to communicate with non-registered users, by utilizing conventional encryption/decryption protocols, as will be described below.

As illustrated in FIG. 1, a plurality of registered client computers 12a, 12b, 12c and non-registered user computers 20a-20b, referred to hereafter as clients, are shown linked to .md message server 60 via a network 40, such as the Internet or other communication systems, as will now be apparent to the reader. The .md message server 60 operates according to the following messaging protocols: the Internet Message Access Protocol (IMAP), the post office protocol (POP), and the simple mail transport protocol (SMTP), each of which is sent over SSL. FIG. 1 illustrates the SMTP/SSL protocol, by way of example.

The registered clients 12a-c and non-registered users 20a-b can be any type of computers including, e.g., IBM Personal Computer compatible devices, Unix-based computers, Linux-based computers or Apple Macintoshes.

The .md message server 60 realizes functions of a Mail server by supporting the reception and transmission of emails over the network 40. It should be understood that the .md message server 60 is involved in communications between at least one registered client computer 12a-c. In the case where there is not at least one registered client computer 12a-c, a host server other than the .md message server 60 performs the Mail server functions. It is noted that in other embodiments, more than one .md message server 60 may be used.

Registered client computers 12a-c represents those clients who are registered with the top-level domain (e.g., the .md domain). As part of the registration process, the registering users are assigned Email and IM addresses associated with the ".md" top-level domain. Top-level domains are well known to those skilled in the Internet arts. These domains include, for example, the ".com" domain and the ".org" domain.

Non-registered users 20a-b, comprise 20a-b, are users who have not registered with the top-level domain. The process of registration is described more fully below with respect to the flowchart of FIG. 2. By virtue of not registering with the top-level domain, these non-registered users 20a-b is never assigned Email and IM addresses from the top-level domain. Therefore, when these non-registered users communicate, with each other or with registered users, they use email addresses typically provided by sub-domain providers such as Yahoo and AOL. FIG. 1 illustrates, by way of example, two exemplary sub-domain email addresses that may be used by a non-registered user (user20a@Yahoo.com and user20b@AOL.com). As is well-known to those knowledgeable in the Internet communication arts, these sub-domain providers, such as Yahoo and AOL, operate on a sub-level domain, distinct from the top-level domain provider of the invention.

With continued reference to FIG. 1, system 10 includes gateway 70, referred to herein as an .mdemail gateway. Gateway 70 represents a gateway typically used with the top-level domain to facilitate email and IM communications intended for non-registered recipients. As will be described below, communications intended for non-registered users are optionally encrypted by the .mdemail gateway 70 in accordance with a preference of the message sender.

II. Data Routing

Figure 2:
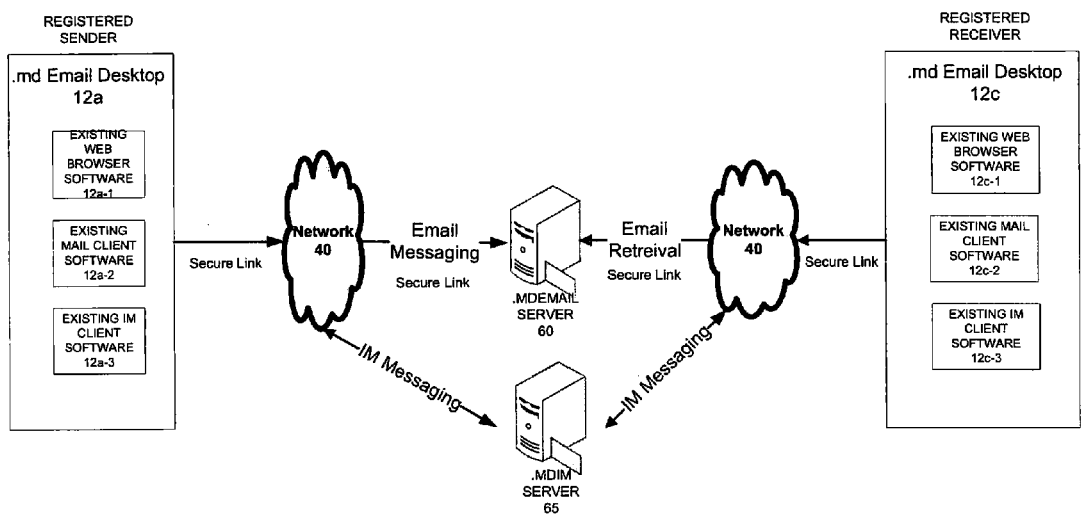
FIG. 2 is a block diagram illustrating a data messaging flow between two registered clients of a top-level domain, according to one embodiment.
Figure 3:
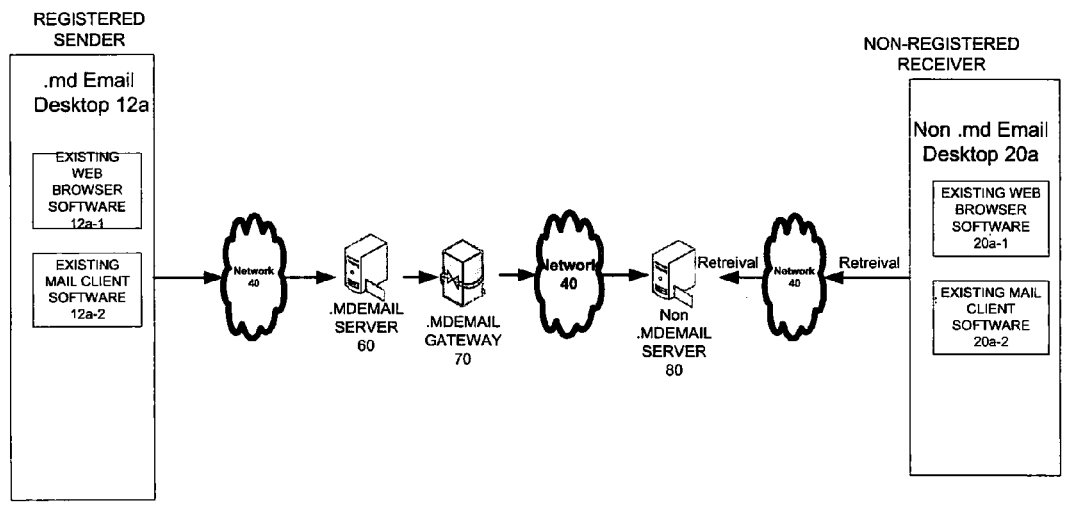
FIG. 3 is a block diagram illustrating a data messaging flow between a registered user of a top-level domain and a non-registered user of the top-level domain, according to one embodiment.
Figure 4:
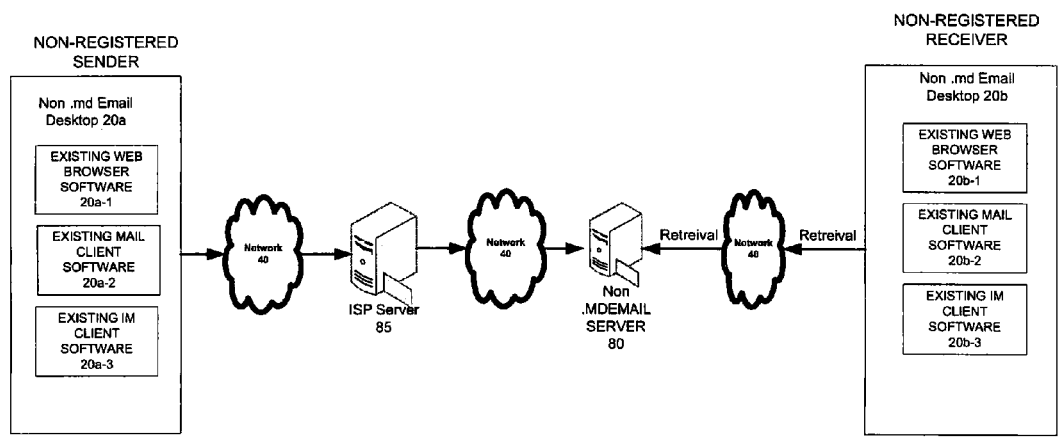
FIG. 4 is a block diagram illustrating a data messaging flow between two non-registered users of a top-level domain, according to one embodiment.

Referring now to FIGS. 2-4 there is shown particular examples of different data routings that may occur in the network of FIG. 1.

With reference now to FIG. 2, there is shown an exemplary data routing that occurs in the case where a registered user (client) of the .md domain (e.g., sender), sends an email via his .md desktop 12a to an .md desktop 12c of another registered user (client) of the .md domain. In this case, the registered client (sending a message) may send an email via existing local mail client software 12a-2 (i.e., software running on the sender's computer), which is well known in the communication arts. Optionally, the sender may send an email message to a recipient via existing web browser software 12a-1 (i.e., software running on the sender's computer), which is also well known in the communication arts. It should be understood that the sender has the further option of sending an IM message via local existing IM client software 12a-3 (i.e., software running on the sender's computer), which is well known in the communication arts.

As shown in FIG. 2, the data message is routed via network 40 directly to an .md message server 60 that is proprietary to the .md top-level domain. The message is then securely retrieved by the .md desktop 12c of the registered recipient from the .md message server 60.

With reference now to FIG. 3, there is shown an exemplary data routing that occurs in the case where a registered user of the .md domain (e.g., message sender), sends an email via the registered user's .md desktop 12a to a non .md desktop 20a of a non-registered user. It should be understood that data routing is different from that described above. Specifically, the message is sent from the .md message server 60 via an .md gateway 70 to a non .md email server 80 (i.e., non-secure email server) of the non-registered user. The non-registered user may then retrieve (download) the message from the non .md email server 80 at his convenience.

It should be understood that when a message is routed to a message recipient via the .md gateway 70, the message is filtered in accordance with rules pre-programmed into the .md gateway 70. For example, the rules can trigger encryption, block mail, redirect mail, insert banners and perform other operations on the mail prior to transmitting the message over network 40 to the message recipient.

With reference now to FIG. 4, there is shown a data routing that occurs in the case where a non-registered user sends an email via his non .md desktop 20a to another non-registered user to his non .md desktop 20b. In this case, the data messaging is sent in a conventional manner, well known in the art. In particular, the data message is sent over network 40 over an insecure connection on the Internet to ISP server 85. The message is then forwarded from the ISP server 85 over an insecure connection to a mail server not associated with the top level domain (i.e., non .mdemail server 80). The message is made available at the non .mdemail server 80 for retrieval by the non-registered recipient. It should be appreciated that in the presently described case, the data messaging does not reach the .md email server of the .md top level domain. In this regard, data messaging security can only be provided via conventional means including, for example, PKI encryption/decryption protocols.

Figure 5:
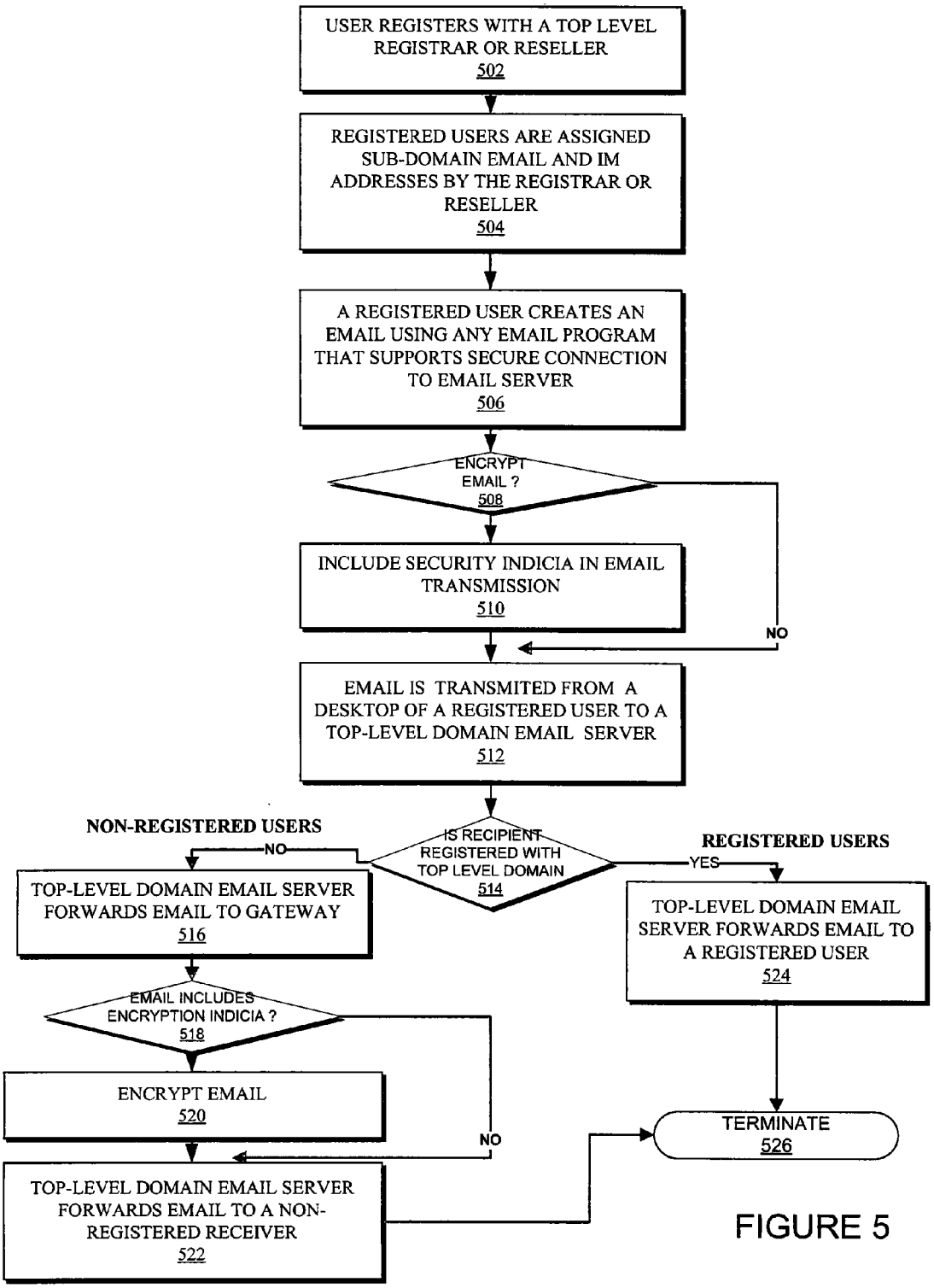
FIG. 5 is a flow diagram illustrating a process for providing end-to-end security for communications over a communication network using email accounts associated with a top-level domain, according to one embodiment.

III. Flowchart Illustrating Email Messaging from a Registered Client of a Top Level Domain to One of Another Registered Client of the Top Level Domain or an Unregistered Client of the Top Level Domain Referring now to FIG. 5, a process is illustrated utilizing the system described above for providing end-to-end security for communications between registered clients of a top level domain and between registered clients of the top level domain and non-registered users.

At step 502: one or more users register with a top-level domain (e.g., the ".md" top-level domain). Upon registering with the .md domain, each user becomes a client of the top-level domain and is provided with a unique sub-domain name, such as abc.md assigned to clients 12a and 12c and xyz.md assigned to client 12b, by way of example.

At step 504, as part of the registration process, the registered clients are also assigned an ".md" email address which serves as both an email and IM address. FIG. 1 illustrates, by way of example, three assigned email addresses: user12a@abc.md assigned to client 12a, user12b@xyz.md assigned to client 12b and user12c@xyz.md assigned to client 12c.

At step 506, the sender 12a (i.e., a registered client with the top level domain) constructs an email by launching an email program. The email program can be any email program that supports a secure connection to the .md message server 60. For example, the sender 12a may launch, Microsoft Outlook™ on his desktop, which will be available with all of the user's custom settings, including email account settings, STMP, POP and IMAP server settings, address book and email folders.

At step 508, the sender 12a determines whether or not to encrypt the message. It is understood that encryption is only necessary when sending messages to users not registered with the top level domain. If the sender 12a encrypts the message, the process continues at 510, otherwise the process continues at 512.

At step 510, the sender 12a includes a security indication (i.e., code) into the email message at the senders desktop to notify the .mdemail gateway 70, that the message should be encrypted before being transmitted to a user not registered with the top level domain (i.e., a non-registered user). For example, the sender may enter the codeword "secure:" into the subject line of the email. In this manner, the .mdemail gateway 70 is notified to encrypt the message, via an encryption module (not shown in FIG. 1) prior to delivering the message over network 40 to a non-registered user. The process of encrypting email messages is well known and thus will not be further described.

At step 512, the email message is transmitted from the sender's desktop, over network 40, to the .md message server 60 in a secure transmission mode via one of POP/SSL, SMTP/SSL or IMAP/SSL.

At decision step 514, upon receiving the email the .md message server 60 determines whether the intended recipient of the Email message is another registered user (e.g., 12b, 12c) of the top-level domain or a non-registered user (e.g., 20a, 20b). In the case where the sender sends an email to another registered user 12a, 12c of the top-level domain, the process continues at step 524, otherwise the process continues at step 516.

At step 516, the Email message is forwarded from the .md message server 60 to the .md gateway server 70.

At decision step 518, a determination is made by the gateway server 70 regarding whether or not the email message includes encryption indicia. If so, the process continues at step 520, otherwise, the process continues at step 522.

At step 520, the email message is encrypted by the .md gateway 70.

At step 522, the email message is forwarded from the and gateway 70 over network 40 to the intended non-registered recipient, via an SMTP connection.

At step 526, the process terminates.

At step 524, the email message is forwarded from the sender's mailbox, which is internal to .md message server 60, to a mailbox of the intended registered recipient. It should be understood that, in this case, the message is never exposed to network 40. At a later point in time, the registered recipient will use IMAP/SSL or POP/SSL over network 40 to retrieve the message.

At step 526, the process terminates.

IV. Configuring .mdEmail to Work with Microsoft Outlook

Referring now to FIGS. 6-11, there is illustrated, a process for configuring the .md email for Microsoft Outlook.

As briefly discussed above, the sender may desire to send an email to an intended non-registered recipient. In this case, if the sender chooses to encrypt the message, in one embodiment, a code is entered into the subject line of the email message. For example, the phrase "secure:" is entered into the subject line of the email. This code or keyword is recognized by the gateway as a flag to encrypt the message prior to transmission over network 40. It should be understood, however, that before this process can take effect, it is first required to configure Outlook, or any other popular email messaging program chosen by the sender, to recognize the code or keyword of choice in order to trigger the encryption module. The process of configuring Microsoft Outlook is described as follows by way of example.

The configuration of Microsoft Outlook is provided by way of example and not limitation. It should be understood that the system of the invention may be integrated with any email client that supports IMAP/SSL, POP/SSL and SMTP/SSL.

IV.1 Configuration Steps

First ensure that you are working a version of Outlook no earlier than Outlook 20003 and Service Pack 2. A procedure for performing such a check is well-known and will not be further described.

At step 1: Launch Outlook on your client computer, e.g., client computer 12*a*.

At step 2: On the menu bar in Outlook, select ADD to add a new email account and click Next.

Figure 6:
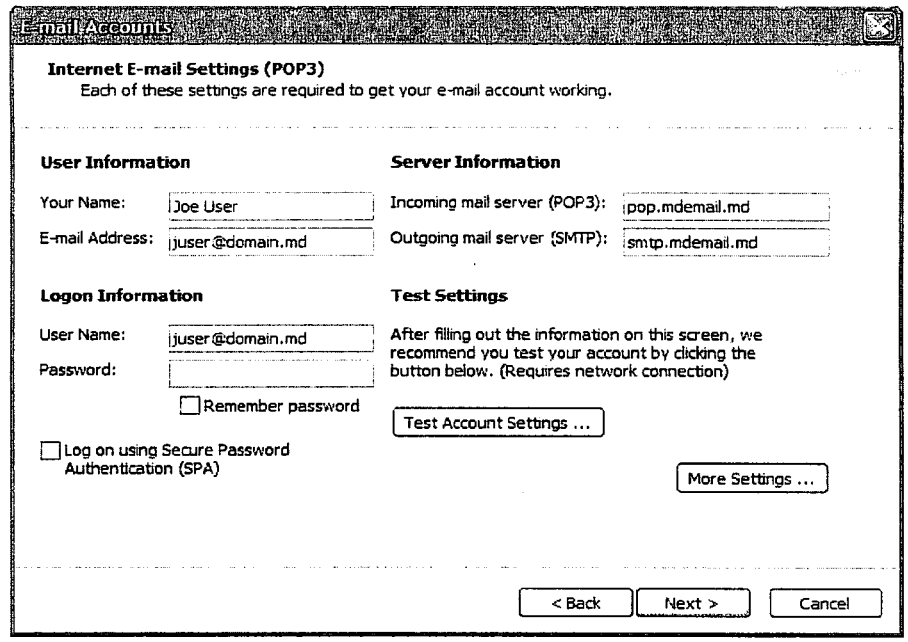
FIGS. 6-9 are screen shots of setting up an account for secure access using Microsoft Outlook.
Figure 7:
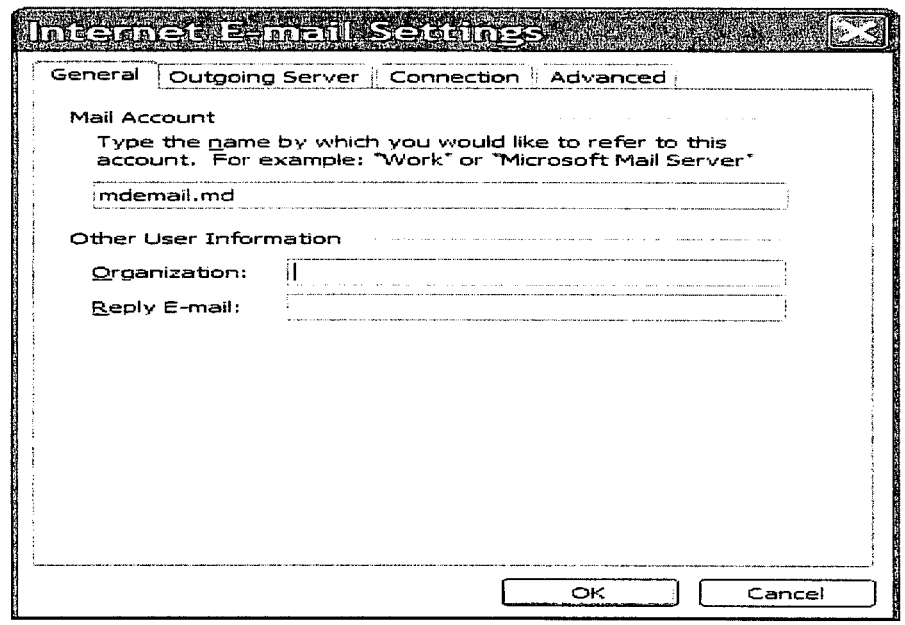

At step 3: Select POP3 and click Next. In response to clicking Next, an Email Accounts window is displayed to the user, as shown in FIG. 6.

At step 4: Enter a name and an .md Email™ address under User Information.

At step 5: Enter the following information under Server Information:

Incoming mail server (POP3): pop.mdemail.md
Outgoing mail server (SMTP): smtp.mdemail.md At step 6: Enter the following information under Logon Information: user@domain.md. It is recommended that the password field be left blank. In this manner, a password will be requested every time the mail client accesses the server. It is also recommended to NOT check Log on using Secure Password Authentication (SPA).

At step 7: The sender clicks on More Settings and is shown FIG. 7.

Figure 8:
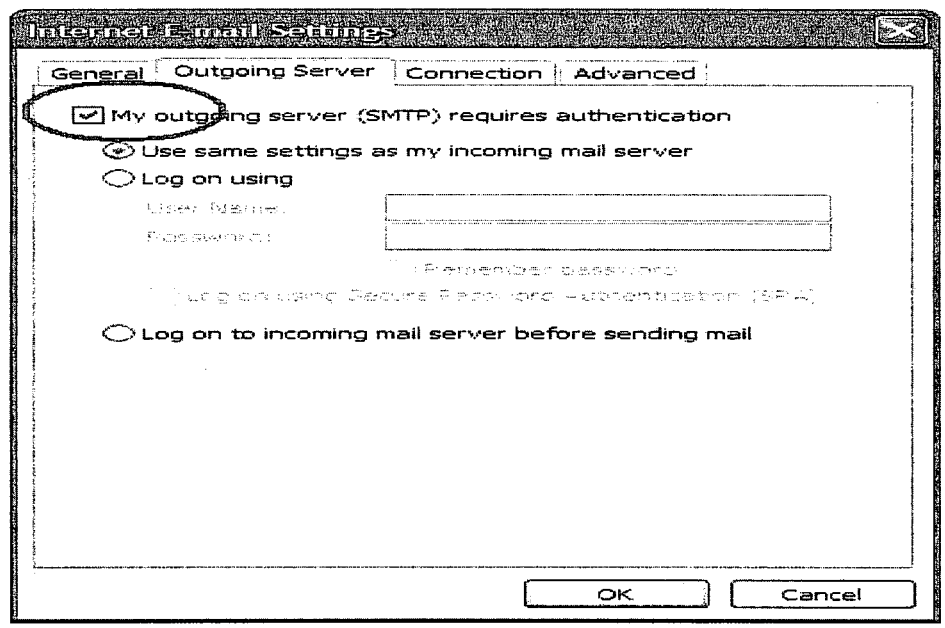

At step 8: Upon selecting the Outgoing Server tab, FIG. 8 is shown. Check the box next to My outgoing server (SMTP) requires authentication. In addition, the radio button associated with Use same settings as my incoming mail server must also be selected.

Figure 9:
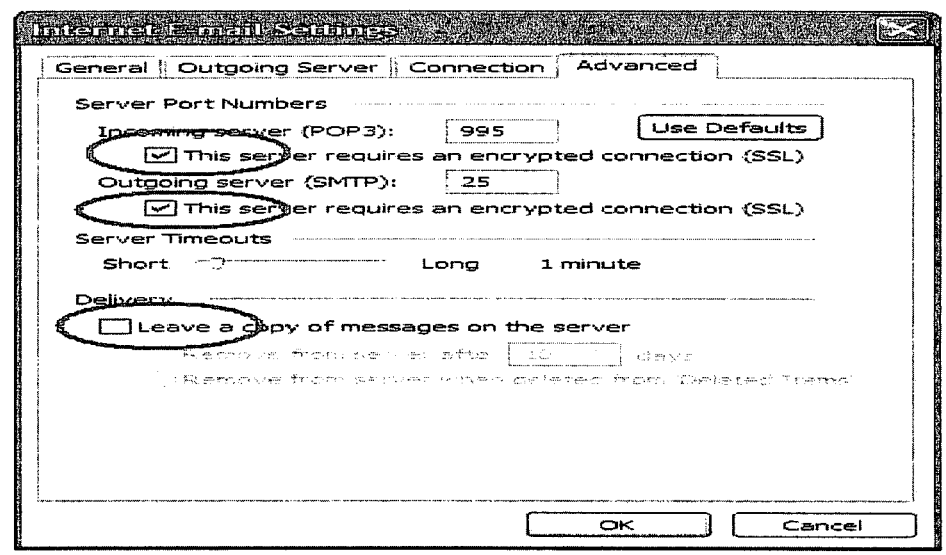
Figure 10:
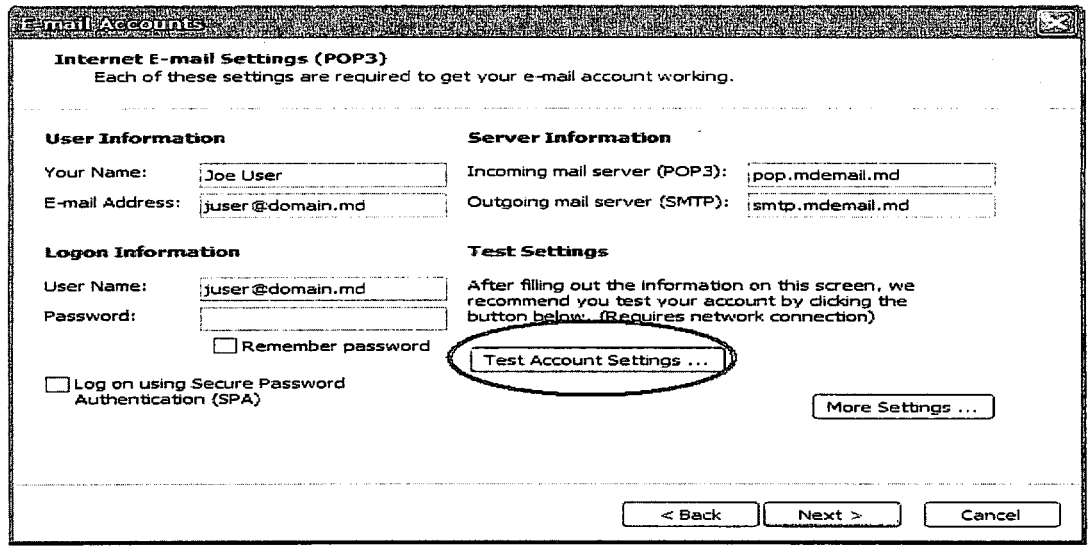

At step 9: Upon selecting the Advanced Tab, FIG. 9 is shown.

At step 10: Under Port Numbers, enter the following information.

Incoming server (POP3): 995
Select the radio button under Incoming Server (POP3) that corresponds to: This server requires an encrypted connection (SSL).
Outgoing server (SMTP): 25
Select This server requires and encrypted connection (SSL) check boxes under both, the POP3, and under the SMTP settings.
Under delivery uncheck the Leave a copy of messages on the server and then click the OK tab.

At step 11: Upon clicking the OK tab at FIG. 9, the user is shown FIG. 10.

Figure 11:
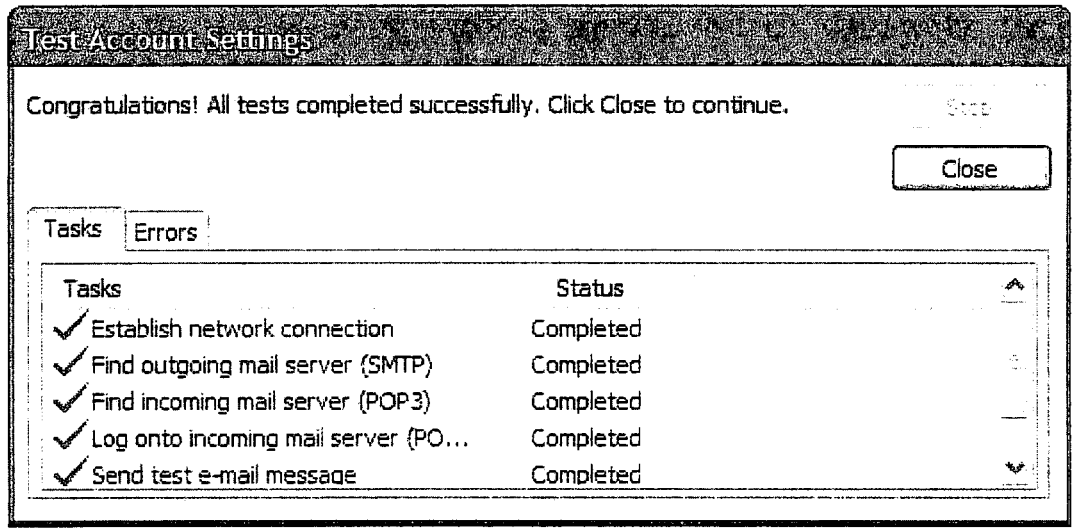

If the test is successful, FIG. 11 is displayed. Otherwise, if the test was unsuccessful, the user must return and review the described procedure to review/correct any errors in the email client configuration.

V. Sending Secure Email Transmissions from Registered Clients to Non-registered Users As discussed above, a key feature of the invention is that messages sent within the top-level domain are automatically secure (i.e., messages sent between registered clients in the top-level domain). It should be understood that no breach is possible in this case. As such, no further encryption is required. However, when a registered user wants to send an email to a non-registered user (i.e., a user outside of the top-level domain who has not registered with the top-level domain) further encryption is required.

The inventors refer to the process of sending secure messages outside of the top-level domain as Sendanywhere™ secure emails which refers to a policy-based secure email application that enables widespread secure email delivery and reply without the need for client-side software.

In the case where a registered user desires to send a non-registered user an encrypted message over network 40, the sender may modify the message to include an encryption indicator which triggers the .md email gateway 70 to encrypt the message prior to transmitting the message over network 40 to an intended non-registered recipient. It is understood that it is the senders choice to encrypt the message or not, however, not encrypting the message makes it vulnerable to attack. This may result as a consequence of the message being stored at a message server node which is a non-secure node, as it is routed to a non-registered recipient.

To facilitate decryption of encrypted messages from a registered sender to a non-registered receiver, the invention utilizes a registration process to register one or more non-registered recipients to enable them to easily decrypt encrypted messages sent from registered clients of the top-level domain.

In different embodiments, the registration process is embodied as either a sender provisioning process or a recipient self-provisioning process. Both processes are described as follows.

V.1 Sender Provisioning Process

In one embodiment of a sender provisioning process, a message sender, who is a registered user of the top-level domain, e.g., registered user 12*a*, can provision non-registered recipients of the top-level domain to easily receive encrypted messages. In this embodiment, provisioning is performed in advance of receiving an encrypted message.

In accordance with this embodiment, the message sender creates an account, in advance, for each non-registered user of the top-level domain, who are intended recipients of encrypted messages to be transmitted at a future time from the message sender. The sender provisioning process, which is performed in advance of message transmissions is described as follows.

At steps 1: the registered user 12*a* signs on to his or her .md top-level admin account, as shown in FIG. 12.

At step 2: As shown in FIG. 13, the registered user 12*a* enters an email address of a non-registered user for whom an account is to be created to easily decrypt encrypted messages sent from the registered user 12*a*.

At step 3: the registered user 12*a* enters a password.

At step 4: As shown in FIG. 14, the registered user 12*a* enters account details which may include: the non-registered user's email address, first and last name, secret question/answer, the country in which the account is located.

Once the registration process has been completed, the non-registered user may receive encrypted emails, referred to herein as secure .mdemail™ messages, from registered clients, e.g., registered user 12*a* of the top-level domain.

V.2 Decrypting Encrypted Messages

Once a non-registered user has been provisioned in accordance with the steps described immediately above, the non-registered user may thereafter receive secure (encrypted) emails from registered clients of the top-level domain. Upon receiving an encrypted email from a registered user, a process for decrypting the encrypted message by a provisioned non-registered is described as follows.

Figure 15:
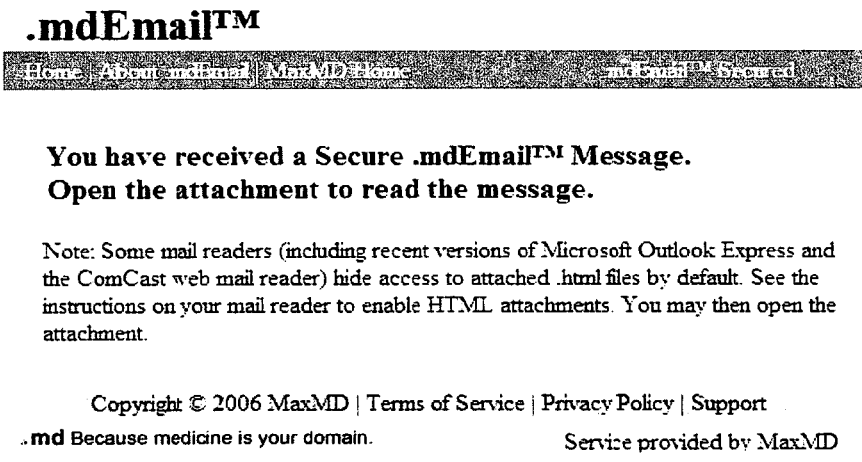

Referring now to FIG. 15, there is shown a text email that is sent to notify the provisioned non-registered recipient, e.g., user20b@AOL.com including instructions on opening the attachment.

Figure 16:
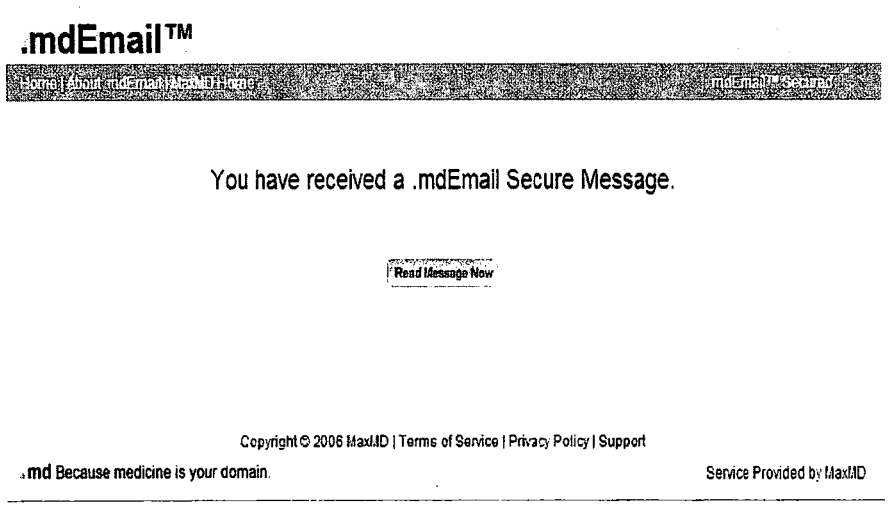

Referring now to FIG. 16, the recipient opens the attachment and selects the "Read Message Now" button.

Figure 17:
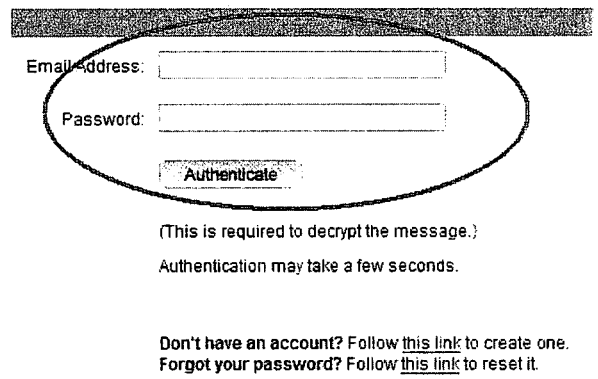

Referring now to FIG. 17, the recipient is prompted to sign onto .mdEmail™ in order to decrypt (i.e., open) the encrypted message. If the recipient has authenticated within the past eight hours, the attachment will open, otherwise it is necessary for the user to re-authenticate himself to the system by entering his email address and password.

Figure 18:
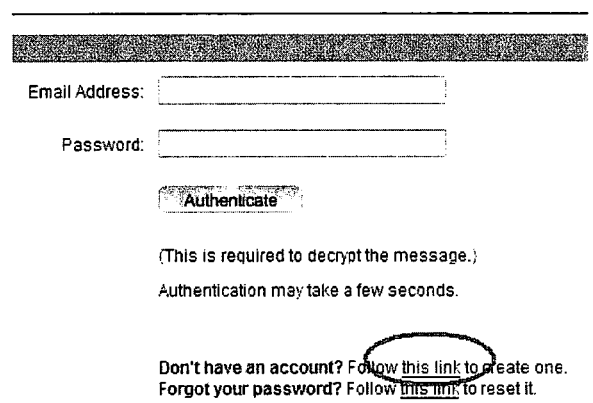

Referring now to FIG. 18, assuming that the recipient has authenticated in the past eight hours (or some other stipulated time period), the message will open. If the recipient has an account and password and has not authenticated in the past eight hours, it is necessary for the user to re-authenticate himself to the system by entering his email address and password.

Referring now to FIG. 19, the user is shown a welcome screen in the case where the recipient has not authenticated in the past eight hours (or some other stipulated time period), prompting the user to complete a registration process with the top level domain via an account registration pop up window. This screen is shown to a user who does not have a password set up for authentication and must execute a round trip email to create an authenticated account to be able to decrypt the message. As shown in FIG. 19, in the case where the email address was populated correctly, the user clicks on the "Yes" button. Otherwise, the user should make the necessary corrections then clicks on the "Yes" button. Upon selecting the "Yes" button the user is shown a pop up window illustrated in FIG. 20.

Referring now to FIG. 20, the user enters and confirms a password for the new account and then clicks on the "Next" button. Upon clicking the "Next" button, the user is shown a confirmation page as illustrated in FIG. 21.

Referring now to FIG. 21, the user is shown a confirmation page indicating that phase I is complete.

Referring now to FIG. 22, the user is sent a confirmation email in the user's email client INBOX entitled "Activate your .mdEmail™ Secure Email Account". The confirmation email contains a link to the .md Server. Clicking this link will activate a pop-up window asking the user to enter his newly created password and finish the account activation process.

Referring now to FIG. 23, there is shown an initiation screen for activating a new .mdEmail™ Secure Email Account. The user is prompted to click on the "click here" link to activate a new account. Upon clicking on the "click here" link, the user is shown a welcome screen, as illustrated in FIG. 24.

Figures 24, 25:
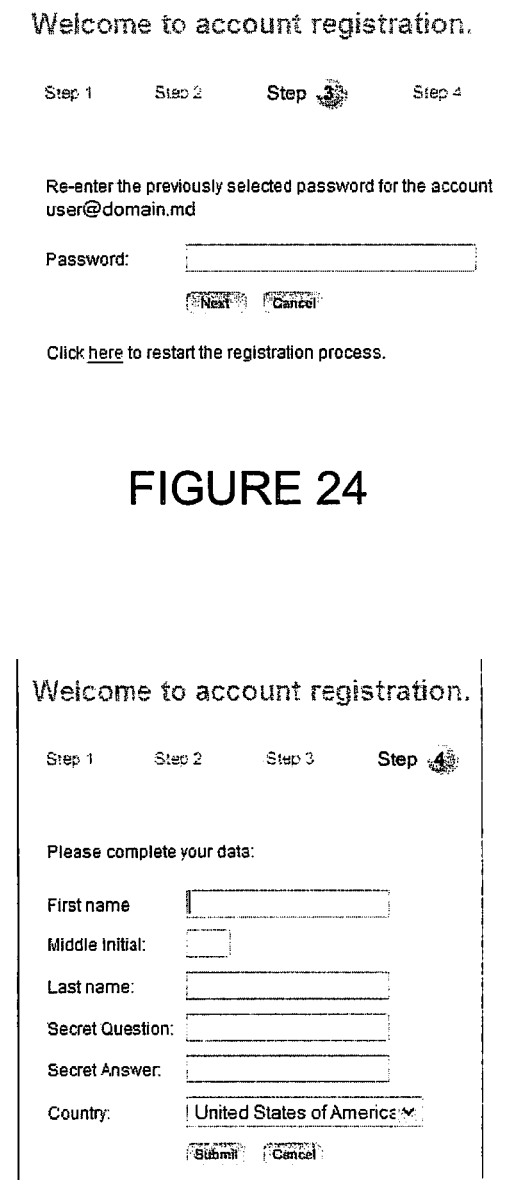

Referring now to FIG. 24, at the welcome screen, the user is prompted to re-enter his or her previously selected password for the new .mdEmail™ Secure Email Account.

Referring now to FIG. 25, the user is shown an account registration screen with data fields for registering the new account. Upon clicking on the "Submit" button, the user is shown a confirmation page, as illustrated in FIG. 23.

Figure 26:
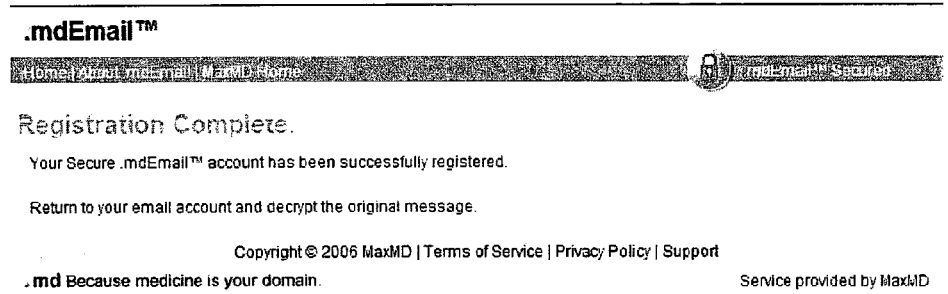

Referring now to FIG. 26, at the confirmation page, the user is instructed to return to the newly established .mdEmail™ Secure Email Account to decrypt the original message.

Figure 27:
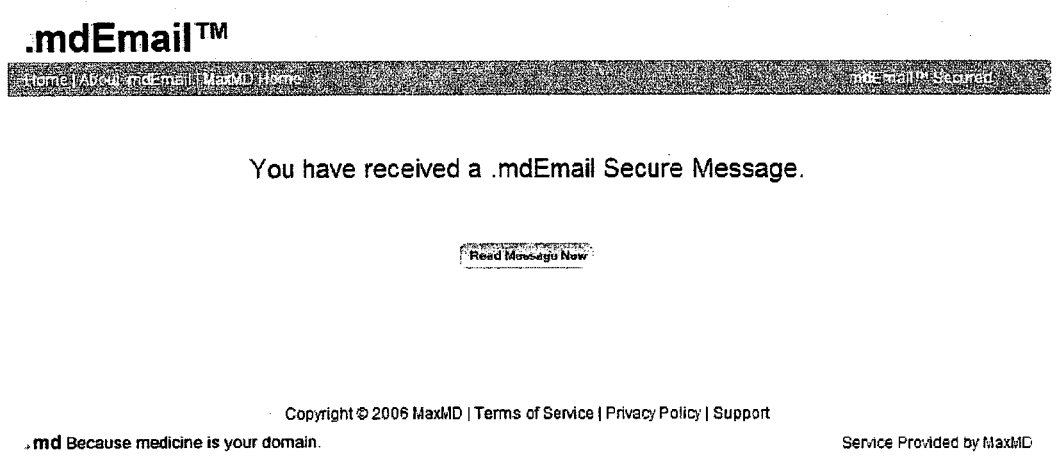

Referring now to FIG. 27, upon opening the attachment at the newly established .mdEmail™ Secure Email Account, the user is shown a notification that he or she has received a secure .mdEmail™ message. Upon clicking on the "Read Message Now" button, the user is shown an authentication screen, as illustrated in FIG. 28.

Figure 28:
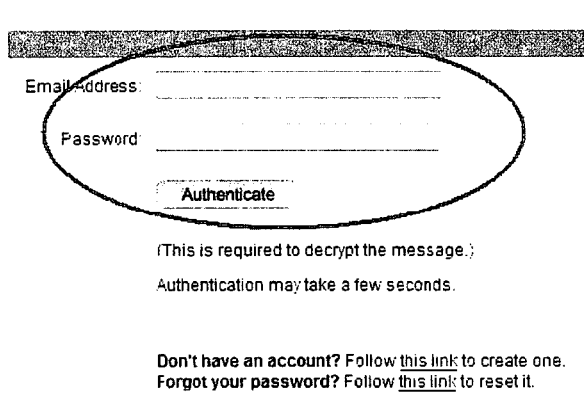
Figure 29:
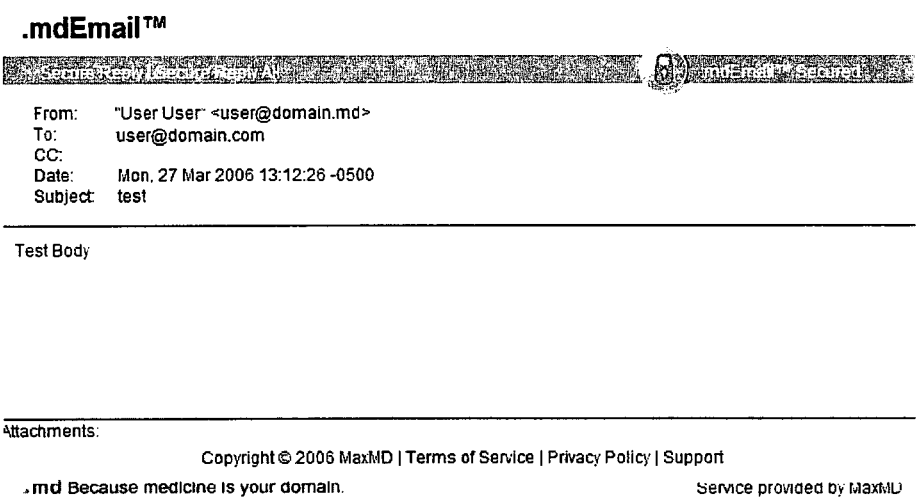
FIG. 29 illustrates the end result of decrypting an email message in a secure browser session.

Referring now to FIG. 28, at the authentication screen, the user is prompted to enter his or her email address and password to decrypt the message. Upon being authenticated by the system 10, the attachment opens, as illustrated in FIG. 29. That is, FIG. 29 illustrates the end result of decrypting an email message in a secure browser session.

Figure 30:
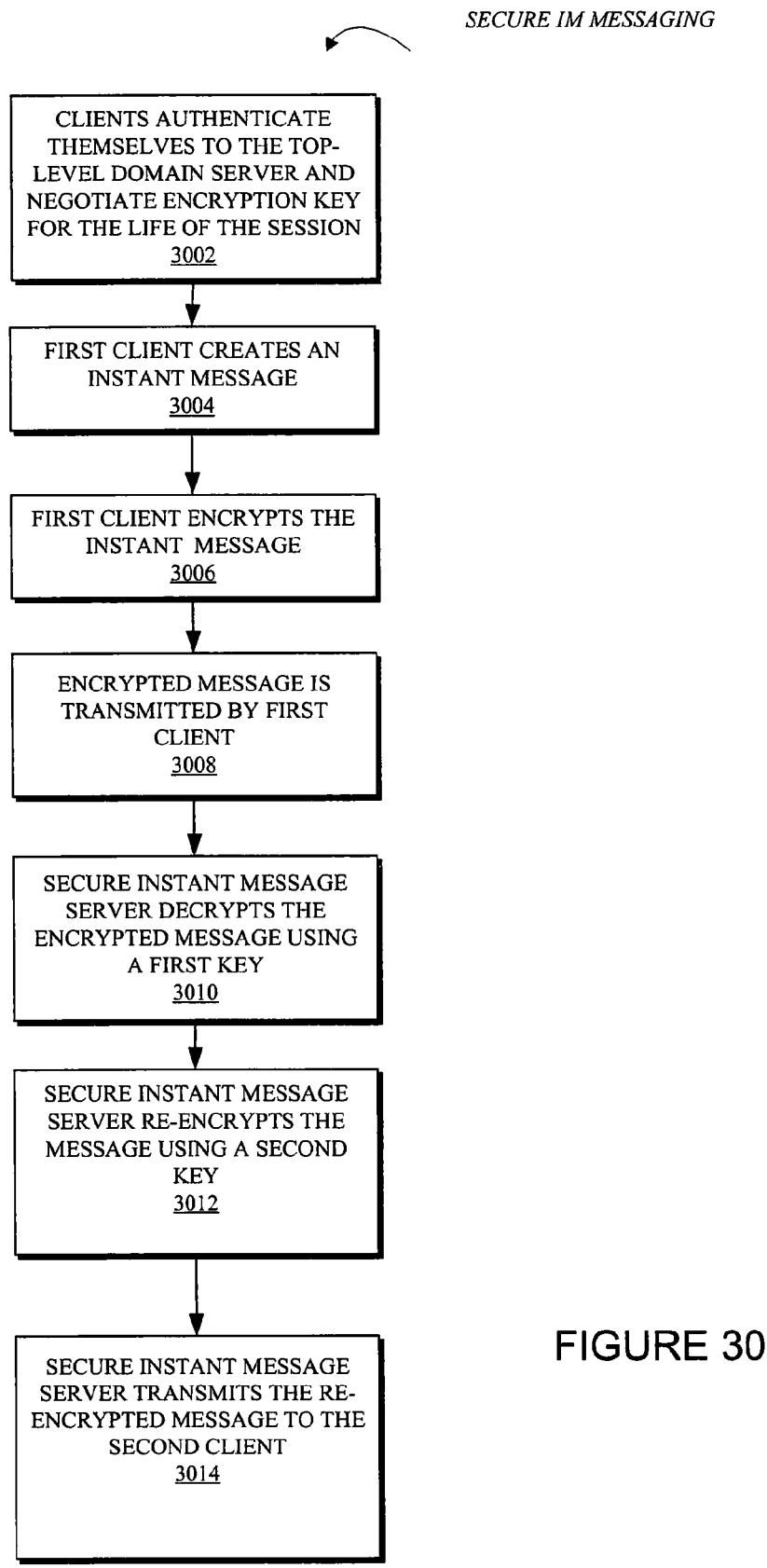
FIG. 30 illustrates a process for a process for providing end-to-end IM messaging security between registered clients of a top level domain.

VI. Flowchart Illustrating Secure IM Messaging Between Two Registered Clients of a Top-Level Domain Referring now to FIG. 30, a process is illustrated utilizing the system described above for providing end-to-end IM messaging security between registered clients of a top level domain.

At step 3002: clients of the top-level domain authenticate themselves to an IM secure message server. Authentication involves the steps of each client exchanging their respective unique secure encryption key with the IM secure message server (see FIG. 1, e.g., .MDIM message server 65). The keys are created and stored in the IM secure message server.

At step 3004: a first client of the top-level domain creates an IM message to be transmitted securely from the first client to a second client (message recipient).

At step 3006: the first client, at his client desktop, encrypts the created IM message using a client encryption key provided by the IM secure message server.

At step 3008: the encrypted IM message is transmitted to the IM secure message server over a secure communication link, such as described above.

At step 3010: the IM secure message server receives and decrypts the encrypted IM message received from the first client via the secure communication link.

At step 3012: the IM secure message server re-encrypts the decrypted IM message using an encryption key associated with the second client (message recipient).

At step 3014: the IM secure message server transmits the re-encrypted IM message to the second client (message recipient) via a second secure communication link.

Multiple variations and modification to the disclosed embodiments will occur, to the extent not mutually exclusive, to those skilled in the art upon consideration of the foregoing description. For example, not all steps are required to be performed in the order disclosed and in fact some steps may be skipped altogether in certain embodiments of the invention. Such variations and modifications, however, fall well within the scope of the present disclosure as set forth in the following claims.

What is claimed:

1. A secure messaging system for a group of clients requiring secured messaging among members of the group, comprising:
    at least one secure message server of a top-level domain; and
    a plurality of registered clients exclusively from the group of clients such that only members of the group are permitted registration as a client, registered with the top-level domain, wherein each of the plurality of registered clients is assigned a top level domain account and only a member of the group is assigned an account in the top-level domain,
    a plurality of secure communication links, communicatively coupling said plurality of registered clients, via said at least one secure message server,
    wherein said at least one secure message server and said plurality of secure communication links are configured to transmit secure messages between said plurality of registered clients using the top-level domain accounts without the need for further encryption/decryption protocols.

2. The secure messaging system of claim 1, wherein said transmitted messages are selected from the group consisting of: email messages and IM messages.

3. The secure messaging system of claim 1, wherein the at least one secure message server is a secure email message server.

4. The secure messaging system of claim 1, wherein the at least one secure message server is a secure IM message server.

5. The secure messaging system of claim 1, wherein the plurality of secure communication links operate in accordance with one of a plurality of secure protocols selected from the group consisting of: simple mail transfer protocol (SMTP) over secure socket layer (SSL), Internet Message Access Protocol (IMAP) over secure socket layer (SSL), and post office protocol (POP) over secure socket layer (SSL).

6. The secure messaging system of claim 1, further comprising: means for registering a client with said top-level domain.

7. The secure messaging system of claim 1, further comprising a gateway server configured to transmit at least one message from one of said plurality of registered clients, via said at least one secure message server, to at least one message recipient, not registered with said top-level domain.

8. The secure messaging system of claim 7, wherein said gateway server is further configured to encrypt said at least one message transmitted prior to transmitting said message to said at least one non-registered message recipient.

9. The secure messaging system of claim 8, wherein said gateway server optionally encrypts said message in response to an indicator provided in said message.

10. The secure messaging system of claim 7, further comprising: provisioning means for provisioning said at least one non-registered message recipient to receive and decrypt encrypted messages received from said gateway server.

11. The secure messaging system of claim 10, wherein said provisioning means, further comprises: means for authenticating said non-registered users to said top-level domain.

12. The secure messaging system of claim 10, wherein said provisioning means for provisioning non-registered message recipients is performed in a pre-operational stage.

13. The secure messaging system of claim 10, wherein said means for provisioning non-registered message recipients is performed substantially concurrent with receiving said encrypted messages.

14. The secure messaging system of claim 1, wherein at least one of the plurality of secure communication links operate in accordance with a Virtual Private Network (VPN) secure protocol.

15. A method for conducting secure messaging between at least two clients registered with a top-level domain, the at least two registered clients comprising a group of clients requiring secured messaging among members of the group, the method comprising:
  creating an email message to be securely transmitted from a first client registered with the top-level domain to a second client registered with said top-level domain, wherein said clients registered with the top-level domain are exclusively from the group of clients such that only members of the group are permitted registration as a client, and wherein each of the registered clients is assigned a top level domain account and only a member of the group is assigned an account in the top-level domain;
  transmitting the email message over a first secure communication link from said first client to a secure message server of the top-level domain;
  re-transmitting the message from the secure message server, via a second secure communication link to said second client,
  wherein said secure messaging between said first registered client and said second registered client is achieved without the need for further encryption/decryption protocols than those provided by said first and second secure communication links and said at least one secure message server.

16. The method of claim 15, wherein said first and second secure communication link are selected in accordance with one of a plurality of secure protocols selected from the group consisting of: simple mail transfer protocol (SMTP) over secure socket layer (SSL) protocol, Internet Message Access Protocol (IMAP) over secure socket layer (SSL) protocol, and post office protocol (POP) over secure socket layer (SSL) protocol.

17. The method of claim 15, wherein the email message is created from a desktop of the first client and received at a desktop of the second client.

18. The method of claim 15, wherein registration comprises assigning an Email and an IM address associated with the top-level domain.

19. The secure messaging system of claim 15, wherein at least one of said first and second secure communication links operate in accordance with a Virtual Private Network (VPN) secure protocol.

20. A method for conducting secure IM messaging between at least two registered clients of a top-level domain, the at least two registered clients comprising a group of clients requiring secured messaging among members of the group, the method comprising:
  a) creating an IM message to be transmitted securely from a first client to a second client, wherein said clients are registered with the top-level domain exclusively from the group of clients such that only members of the group are permitted registration as a client, and wherein each of the registered clients is assigned a top level domain account and only a member of the group is assigned an account in the top-level domain;
  b) encrypting the created IM message at said first client using said first client encryption key;
  c) transmitting the IM message over a first secure communication link to said secure IM message server;
  d) decrypting the IM message at the secure message server using said first client encryption key;
  e) re-encrypting the IM message at the secure message server using said second client encryption key; and
  f) transmitting the re-encrypted message from the secure message server, via a second secure communication link to said second client.

21. A method according to claim 20, further comprising the steps of:
  a first registered client authenticating himself to an IM secure message server associated with the top-level domain, prior to said step (a);
  a second registered client authenticating himself to said secure IM message server, prior to said step (b)
  wherein authentication is a pre-requisite to sending IM messages between said two registered clients.

22. A method according to claim 21, wherein authentication must be re-established between said first client and said IM secure message server and said second client and said IM secure message server after a prescribed time period has elapsed.

23. The secure messaging system of claim 20, wherein at least one of said first and second secure communication links operate in accordance with a Virtual Private Network (VPN) secure protocol.

* * * * *